Nov. 9, 1965 G. F. COOPER ETAL 3,217,276
DISTRIBUTED NETWORK ATTENUATOR
Original Filed May 2, 1957

INVENTORS
Glenn F. Cooper
Alan B. Smith

BY Connolly and Hutz
ATTORNEYS

3,217,276
DISTRIBUTED NETWORK ATTENUATOR

Glenn F. Cooper and Alan B. Smith, North Adams, Mass., assignors to Sprague Electric Company, North Adams, Mass., a corporation of Massachusetts Original application May 2, 1957, Ser. No. 656,533, now Patent No. 3,109,983, dated Nov. 5, 1963. Divided and this application Feb. 12, 1963, Ser. No. 264,739
4 Claims. (Cl. 333—81)

This case is a division of Serial Number 656,533, filed May 2, 1957, now Patent Number 3,109,983 granted Nov. 5, 1963.

The present invention relates to electric circuits for carrying signals and more particularly such circuits in which there is a distributed characteristic such as a capacitance.

Among the objects of the present invention is the provision of novel circuit components and circuits of the above type that have particularly desirable characteristics.

The above as well as additional objects of the present invention will be more clearly understood from the following description of several of its exemplifications, reference being made to the accompanying drawings wherein.

Figure 4A:
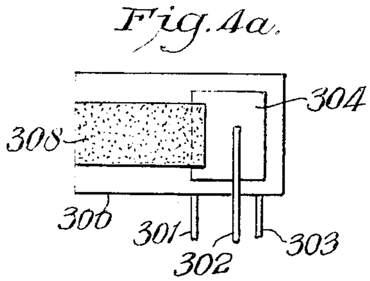
FIGS. 4 and 5 are plan views of additional circuit component modifications illustrative of the present invention.
Figure 5A:
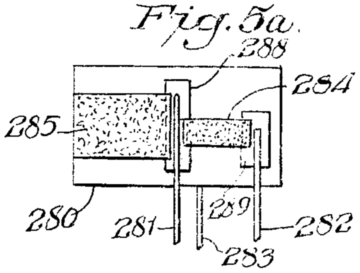
Figure 4B:
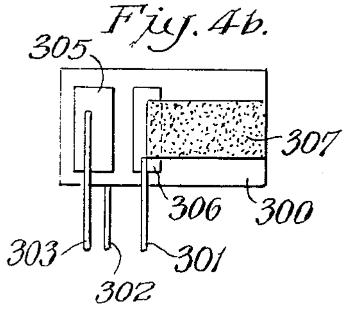
Figure 5B:
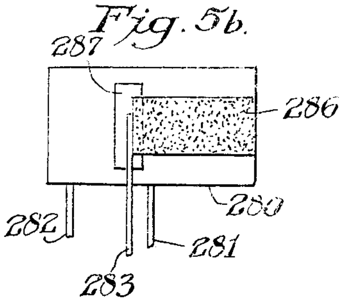

In FIGURES 4 and 5 *a* and *b* views are shown, with the *a* view showing one side of the component and the *b* view showing the opposite side.

A very desirable circuit component according to the present invention has a dielectric stratum with separate elongated resistance layers opposing each other on opposite faces of the stratum, the layers being free of terminal connections except for a first terminal connection at one end of one layer, and a second terminal connection at the longitudinally opposite end of the other layer.

Where a relatively large capacitance is required between the two resistance layers and the bulk of the component is to be kept small, it is very convenient to use as the dielectric stratum a high dielectric constant ceramic of a barium titanate type such as one having a dielectric constant no smaller than 500 and a thickness no greater than 25 mils. Components of this type are very effectively used as by-pass returns for the taps of compensated volume controls, as well as in arc suppressing shunts for switching contacts in relays and similar devices. For small capacitances, a dielectric stratum with a very low dielectric constant is suitable and the dielectric thickness can be much larger. This type of construction is very effective for feedback neutralization of transistor amplifiers.

The ceramic plate can be made in the manner described in U.S. Patent 2,402,515, granted June 18, 1946, and the silver and resistance layers applied as shown in the above patent or in the National Bureau of Standards Circular 468 issued November 15, 1947, entitled Printed Circuit Techniques. Any highly conductive material can be used in place of the silver. Such metals as palladium, platinum, gold and nickel are representative of suitable alternate metals. These conductive materials need not be soldered to their leads, but can be pressed as by spring tension or held in any other way.

It is preferred that the resistance and capacitance of the assemblies of the present invention both be distributed over an appreciable area. Thus the resistor layer should have a length in the direction of signal passage of at least about ⅛ inch. The longer the better, but a length of more than 1½ inches generally makes the assembly too large for use with ceramic supports.

Figure 1:
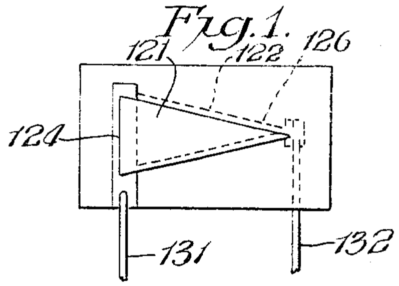
FIG. 1 is a plan view of a circuit according to the present invention.

The impedance characteristics of the assembly of the invention can be modified by tapering the resistance layers. In FIGURE 1 resistance layers 121 and 122 are made triangular with the wide portion 124 of layer 121 connected to lead 131 and the narrow end 126 of coating 122 connected to lead 132. Because of the tapering, the construction of FIG. 1 shows gradual reciprocal changes of the effective resistance and capacitance. In other words, as the current flows from lead 131 to lead 132, each incremental portion of the path has a greater resistance and a lower capacitance than the preceding portion. This steepens the phase angle change with frequency.

It is not essential that the opposed coatings of the present invention be of the same size or shape, or that they overlap exactly. An offset in any direction up to 10% of the active current carrying dimension in that direction has substantially no effect. One coating can also be wider and/or longer than the other, and this is in fact desirable for simplifying registration problems.

Figure 2:
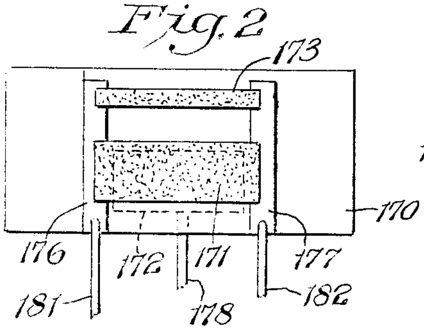
FIGS. 2 and 3 are plan views of further constructions in accordance with this invention.

A construction of this type in which no tapering is used is shown in FIG. 2. Here a plate 170 carries on one face a first generally rectangular resistance layer 171 and a second generally rectangular resistance coating 173. On the other face it carries a conductive coating 172 that opposes the resistance coating 171. Resistance coating 173 is connected in parallel by means of silver terminals 176, 177 to layer 171. Leads 181, 182 are connected to the respective terminals and a separate terminal lead 178 is connected to layer 172.

Figure 3:
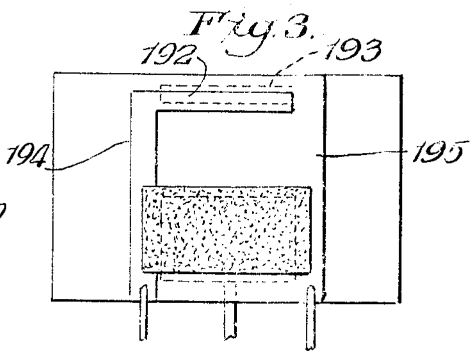

In FIG. 3, where the bridging capacitance is provided by extensions 192 and 193 of the resistance layer connection strips 194 and 195, as shown, one of the extensions can be connected across the edge of the plate and over to the reverse face to oppose the other extension. Alternatively, the bridging capacitance can be provided by edge effect with both extensions on the same face of the plate and in close proximity.

For infinite rejection in this embodiment, the ratio of the larger capacitance to the smaller is typically about 20 and with minimum stray capacitance it approaches 18. If maximum rejection is not desired, the ratio can be in the range of from 10 to 40.

The constructions of FIGS. 2 and 3 can also have tapered resistance layers to steepen even further the transfer characteristics. On the other hand, the construction of FIG. 1 can also have only one of the resistance layers tapered. In this modification the steepness of the transfer is not changed as much as with both layers tapered. In general, a taper of at least 15° as measured at the vertex angle, where the tapering edges intersect, is desired. A taper of more than about 135° makes the coating too short. However, the taper need not be uniform nor symmetrical. For instance, one or both longitudinal side edges of the coating layer can be curved. The narrow end of the taper should be no more than one-fourth as wide as the wide end to obtain a significant change.

Instead of having the plates rectangular as illustrated in the above figures, they can be oval, circular, or even polygonal, or any other shape. The plates can also be arched or curved, rather than flat, and the units can for example have a tubular dielectric with the coatings on the inner and outer surfaces of the tube.

Units such as shown in FIGS. 1, 2, 3, 4 and 5 can be left uncovered, or they can be protected by a covering such as the resin dip coating described in U.S. Patent 2,665,376 granted July 5, 1954.

Instead of having the conductive strata of the present invention applied by firing, they can be merely cemented in place or frictionally held as by an external clamping arrangement. The resistive layers can also be in the form of independently self-supporting strips cemented or frictionally held. Such alternate constructions are quite suitable for use with low dielectric constant plates such as those made of steatite or mica, or even Bakelite. With such materials, the minute air gaps that cannot be avoided when separate members are clamped against the dielectric, do not significantly detract from the valuable capacitance.

Also in the constructions of FIGS. 2 and 3, the bridging resistor 173 or bridging capacitor 192, 193 can be supplied by a separate component not mounted on the supporting plate with the remainder of the components.

FIG. 4 shows a circuit component in the form of a filter which provides an attenuation having a slope of 10 db per decade. This circuit which is printed on a plate 280 includes a distributed element whose active electrodes are 285 and 286, and a lumped resistor 284. Connections are made to the two ends of the lumped resistor by means of conductive areas 288 and 289, to which are attached leads 281 and 282 respectively. Conductive area 288 is common to both the resistor 284 and to resistive area 285 which forms one electrode of the distributed element. Resistive area 285 extends to the edge of the plate and over the edge where it joins resistive area 286, forming a continuous folded resistive strip with the two halves in capacitive relationship. Resistive area 286 terminates in conductive strip 287 to which is connected lead 283. The combination of FIG. 4 can be used as a three terminal attenuation network, two of the possible means of connecting to the three terminals being especially useful. In the first of these, lead 283 is the input, lead 281 the output, and lead 282 is common to both circuits. With this connection for low frequencies, the attenuation is a constant value which does not change appreciably with frequency and there is substantially no phase shift through the device. For high frequencies, the attenuation through the device drops at the rate of 10 db per decade, and the output voltage leads the input voltage by 45°. The performance described is obtained to a fair approximation when resistor 284 has $\frac{1}{10}$ or less the resistance measured between leads 281 and 283, i.e., the resistance of the distributed element. The transition between a constant attenuation and the attenuation characteristic rising at about 10 db per decade occurs when the product of frequency, resistance of the distributed element, and D.C. capacity of the distributed element equals approximately 0.25.

For example, if the distributed resistance is 1 megohm, the D.C. value of the distributed capacitance is 0.01 microfarad, and the value of the lumped resistor is 10,000 ohms, then the attenuation which is substantially constant with frequency below 25 cycles rises at approximately 10 db per decade at values appreciably above 25 cycles. This 10 db rise continues to well above 2500 cycles and is accompanied by a phase shift between input and output of approximately 45°. The fact that this device is capable of a 10 db slope of attenuation over wide frequency range is one of its advantages, as it is impossible to achieve this with any simple combination of lumped resistors and capacitors.

The second method of connecting the device illustrated in FIG. 4 is to use lead 282 as the input, lead 281 as the output and lead 283 as the common connection. When so connected, and when the resistance of the distributed element is less than the lumped resistor, or of the same order of magnitude, an attenuation is obtained whose attenuation increases at approximately 10 db per decade above a certain frequency. Also, above the same frequency, this attenuation has a constant phase shift of −45°. Below this frequency the attenuation is substantially constant, and the phase shift through the device is practically zero. If, for example, a lumped resistance of 10,000 ohms, a distributed resistance of 1,000 ohms, and a distributed capacitance of 0.01 microfarad are used, the transition region would occur at about 25 kilocycles.

Another circuit component in the form of a filter is shown in FIG. 5. This filter also is composed of a lumped element and a distributed element with one common terminal; all of which are mounted on supporting plate 300. Conducting areas 304 and 305 form the two plates of a lumped capacitor. To these conducting areas are attached, respectively, leads 302 and 303. Conducting area 304, in addition to forming one plate of the capacitor, is also connected to one end of the distributed element 307, 308. The other end of the distributed element is terminated at conductive strip 306 to which is connected lead 301. The distributed element 307, 308 is printed of some resistive material which extends over the end of the plate connecting the two resistive areas on each side of the plate.

In one method of utilizing this filter network, the input is connected to lead 303, the output is taken from lead 302, and lead 301 is common to both circuits. In this connection, a high pass filter is obtained which for low frequencies has an attenuation which decreases at 20 db per decade and in which the output leads the input by 90°. For mid-frequencies, a constant slope of less than 10 db per decade and a phase shift of less than 45° is produced over a considerable range. This slope approaches 10 db per decade when the ratio of distributed to lumped capacity is greater than about 20. At very high frequencies the filter has substantially no attenuation. The transition between the 20 db slope and the reduced slope occurs at approximately the point where the product of distributed capacity, distributed resistance, and frequency is 0.25. Connecting the filter of FIG. 5 with lead 301 as input lead, 302 as output, and lead 303 as the common connection gives a filter with zero attenuation at low frequencies and an attenuation which increases at 10 db per decade at high frequencies. At low frequencies, there is substantially no phase shift through the device, while at high frequencies, a constant −45° shift is maintained. During the transition region, phase shifts of a greater absolute magnitude than 45° are obtained, if the ratio of the lumped to the distributed capacity is greater than about one. The transition to a 45° angle occurs at approximately the same point as in the other connection for FIG. 5.

It is not necessary for the distributed element in FIGS. 4 and 5 to be made in exactly the form shown. It would be possible for one of the electrodes, i.e., either 285 or 286 in FIG. 4, or 308 or 307 in FIG. 5 to be made of conducting material. The operation would be unchanged, as long as the total resistance of the distributed element were the same in both cases.

It is also possible to replace one of the resistive electrodes of the distributed element by a conductive electrode and to make both connections to the distributed element on one side of the plate. In FIG. 4, this could be accomplished by making area 286 a conductive area which would not extend quite to the edge of the plate, and by connecting lead 283 to the end of area 285. No connection would be made between areas 286 and 285. The same variation would also be made in FIG. 5. The performance of the device with such a construction would be similar to the other constructions, except that the D.C. capacity of the distributed section would have to be four times as great for the same performance.

Similar attenuation characteristics to those obtained from the constructions of FIGS. 4 and 5 could be obtained using separate lumped components instead of, or in addition to, the lumped components printed on the plates, although this would not, as a rule, be the most economical construction. There are cases, however, where the lumped element is not easily separable from the circuit in which the distributed device is to be used. An example of this would be the case where the distributed component is used in conjunction with the collector resistance of a transistor to give attenuation characteristics similar to those cited above for the constructions of FIG. 4. In some cases it may be desirable to apply a low dielectric constant material under the lumped resistor 284 in FIG. 4 to reduce stray capacities. It is also possible to taper the distributed elements in either FIG. 4 or FIG. 5 to modify the impedance characteristics of the distributed element and hence to alter the overall transfer characteristics of the filter. With no taper, the distributed element approaches a phase angle of —45° above a certain frequency, and its impedance decreases at the rate of 10 db per decade above this same frequency. It is this impedance characteristic that gives the distributed filter its desirable and unique characteristics. With a practical amount of tapering of the distributed element, its impedance characteristics may be modified so as to provide a high frequency slope of attenuation of from about 3 db to 17 db per decade, and a phase angle of from —15° to about —75°. The characteristics of the filters of FIGS. 4 and 5 will then be changed accordingly, with it being possible to maintain a +15° to +75° phase shift and a ±3 db to ±17 db per decade slope of attenuation over a wide range in the same manner that the ±45° phase shifts and ±10 db per decade slopes were maintained in the specific examples cited above.

The distributed element may be tapered no matter which of the various constructions described is used for the distributed element. In the construction shown in FIG. 4, for example, the resistive areas 285 and 286 could be tapered so that the narrow end of these areas would be at the edge of the plate where the two areas are joined. This distributed element would then have a rate of impedance decrease of greater than 10 db per decade, and an angle greater in absolute magnitude than 45°. Tapering in the opposite direction would give an angle of absolute magnitude less than 45° and a slope of less than 10 db per decade.

As the examples show, these filters are capable of giving constant positive or negative phase shifts of from 15 to 75° over wide ranges of frequencies. This is a valuable characteristic which cannot be achieved with any simple lumped filter. By combining these filters, any desired constant phase shift and the corresponding constant rate of attenuation change with frequency may be obtained.

Although throughout this discussion, the dielectric members have been disclosed as flat plates, it should be understood that other configurations, for example, tubular bodies, are within the scope of our invention.

Obviously many modifications and variations of the present invention are possible in the light of the above teachings. It is therefore to be understood that within the scope of the appended claims, the invention may be practiced otherwise than as specifically described.

What is claimed is:

1. An attenuator having constant attenuation value at low frequencies comprising a distributed network consisting of a rigid dielectric element, a continuous folded resistive strip arranged around an edge of the element and forming a first electrode on one surface of the element and a second electrode on the other surface of the element said electrodes being in capacitive relationship with one another, at least one of said electrodes having appreciable resistance, a resistor separate from said network, a first terminal connected between said resistor and said second electrode, a second terminal connected to said first electrode spaced from said edge, a third terminal connected to said resistor spaced from said first terminal, an input connected to the network at the second terminal, an output connected to the connection between the second electrode and the resistor at the first terminal and the other end of the resistor connected to ground at the third terminal, whereby at low frequencies the attenuation is substantially constant and at higher frequencies the attenuation decreases.

2. The attenuator of claim 1 wherein said electrodes are of tapered configuration.

3. An attenuator having constant attenuation value at low frequencies comprising a distributed network consisting of a rigid dielectric element, a continuous folded resistive strip arranged around an edge of the element and forming a first electrode on one surface of the element and a second electrode on the other surface of the element said electrodes being in capacitive relationship with one another, at least one of said electrodes having appreciable resistance, a resistor separate from said network, a first terminal connected between said resistor and said second electrode, a second terminal connected to said first electrode spaced from said edge, a third terminal connected to said resistor spaced from said first terminal, an input connected to said resistor at said third terminal, an output connected between said resistor and said second electrode at said first terminal and the second terminal connected to ground whereby at low frequencies the attenuation is substantially constant and at higher frequencies the attenuation increases.

4. The attenuator of claim 3 wherein said electrodes are of tapered configuration.

References Cited by the Examiner

UNITED STATES PATENTS

| | | | |
|---|---|---|---|
| 2,126,915 | 8/38 | Norton | 333—70 |
| 2,493,199 | 1/50 | Khouri et al. | 333—70 |
| 2,634,330 | 4/53 | Gaudio | 323—74 |
| 2,637,777 | 5/53 | Kilby et al. | 333—70 |
| 2,694,185 | 11/54 | Kodama | 317—256 X |
| 2,828,454 | 3/58 | Khouri | 323—73 X |

HERMAN KARL SAALBACH, *Primary Examiner.*

UNITED STATES PATENT OFFICE

CERTIFICATE OF CORRECTION

Patent No. 3,217,276

November 9, 1965

Glenn F. Cooper et al.

It is hereby certified that error appears in the above numbered patent requiring correction and that the said Letters Patent should read as corrected below.

Column 5, line 22, for "+15° to +75°" read -- ±15° to ±75° --.

Signed and sealed this 9th day of August 1966.

(SEAL)
Attest:

ERNEST W. SWIDER
Attesting Officer

EDWARD J. BRENNER
Commissioner of Patents